US012618435B2

(12) United States Patent
Matsagkos et al.

(10) Patent No.: US 12,618,435 B2
(45) Date of Patent: May 5, 2026

(54) GLIDE BEARING ASSEMBLY

(71) Applicant: Ocado Innovation Limited, Hatfield (GB)

(72) Inventors: Alexandros Matsagkos, Hatfield (GB); Arvid Hällje, Hatfield (GB)

(73) Assignee: Ocado Innovation Limited, Hatfield (GB)

( * ) Notice: Subject to any disclaimer, the term of this patent is extended or adjusted under 35 U.S.C. 154(b) by 370 days.

(21) Appl. No.: 18/563,430

(22) PCT Filed: May 25, 2022

(86) PCT No.: PCT/EP2022/064204
§ 371 (c)(1),
(2) Date: Nov. 22, 2023

(87) PCT Pub. No.: WO2022/248552
PCT Pub. Date: Dec. 1, 2022

(65) Prior Publication Data
US 2024/0218905 A1     Jul. 4, 2024

(30) Foreign Application Priority Data
May 25, 2021     (GB) ...................................... 2107403

(51) Int. Cl.
*F16C 29/02*          (2006.01)
*B65G 1/04*          (2006.01)
(52) U.S. Cl.
CPC ............ *F16C 29/02* (2013.01); *B65G 1/0492* (2013.01)
(58) Field of Classification Search
CPC .................................. G06Q 10/08; F16C 29/02
See application file for complete search history.

(56) References Cited

U.S. PATENT DOCUMENTS

| | | | |
|---|---|---|---|
| 5,429,438 A | 7/1995 | Wood |
| 2011/0058760 A1 | 3/2011 | Magnus |
| | (Continued) | |

FOREIGN PATENT DOCUMENTS

| | | |
|---|---|---|
| CN | 209758186 U | 12/2019 |
| DE | 102018201929 A1 | 8/2019 |
| | (Continued) | |

OTHER PUBLICATIONS

Fernandes, J., et al. "Intralogistics and industry 4.0: designing a novel shuttle with picking system." Procedia Manufacturing 38 (2019): 1801-1832. (Year: 2019).*

(Continued)

*Primary Examiner* — Emmett K. Walsh
(74) *Attorney, Agent, or Firm* — Gregory Matt McCloskey

(57) ABSTRACT

The disclosure relates to a load-handling device for lifting and moving storage containers stacked in a storage structure. The load-handling device includes a body mounted on a first set of wheels to engage a first set of parallel tracks and a second set of wheels to engage with a second set of parallel tracks. A direction-change assembly is configured to raise or lower the first and second sets of wheels with respect to the body to engage one of the first or second sets of wheels with the parallel tracks and disengage the other of the first or second sets of wheels from the parallel tracks. A glide bearing assembly includes a bearing element including a sliding surface defining a contact line along which the direction-change assembly moves with respect to the body when raising or lowering the first and second sets of wheels.

13 Claims, 11 Drawing Sheets

(56) References Cited

U.S. PATENT DOCUMENTS

| | | | |
|---|---|---|---|
| 2014/0086714 A1 | 3/2014 | Malik | |
| 2020/0391941 A1 | 12/2020 | Austrheim et al. | |
| 2022/0119210 A1* | 4/2022 | Felton | G06Q 50/10 |
| 2022/0153519 A1 | 5/2022 | Popa et al. | |

FOREIGN PATENT DOCUMENTS

| | | |
|---|---|---|
| GB | 2520104 A | 5/2015 |
| JP | 2011163504 A | 8/2011 |
| JP | 2021510138 A | 4/2021 |
| WO | 2019137866 A1 | 7/2019 |
| WO | 2020193406 A1 | 10/2020 |

OTHER PUBLICATIONS

First Office Action issued on Feb. 4, 2025, by the Japanese Patent Office in corresponding Japanese Patent Application No. 2023-572566, and an English Translation of the Office Action. (6 pages).

Office Action (Examination Report No. 1) issued on Nov. 27, 2024, by the Australian Patent Office in corresponding Australian Patent Application No. 2022281086. (4 pages).

Office Action issued on Feb. 26, 2025 by the Canadian Patent Office in corresponding Canadian Application No. 3,220,749 (3 pages) corresponding to Applicant's U.S. Appl. No. 18/563,430.

Office Action issued on Aug. 8, 2025 by the Koren Patent Office in corresponding Korean Application No. 10-2023-7044642 (8 pages) corresponding to Applicant's U.S. Appl. No. 18/563,430.

Combined Search and Examination Report under Section 17 in corresponding Application No. GB2107403.4 dated Feb. 18, 2022.

International Search Report (PCT/ISA/210) and Written Opinion (PCT/ISA/237) mailed on Sep. 22, 2022, by the European Patent Office as the International Searching Authority for International Application No. PCT/EP2022/064204.

* cited by examiner

GLIDE BEARING ASSEMBLY

The invention relates to a glide bearing assembly and in particular a guide bearing assembly for a load-handling device.

BACKGROUND

GB2520104A (Ocado Innovation) describes a system in which stacks of containers are arranged within a storage structure that supports load-handling devices. The load-handling devices each cover one grid space of the storage structure, thus allowing high density of load handlers and thus high throughput of a given size system. The robotic load-handling devices are controllably moved around the top of the storage structure on a track system forming a grid. Each load-handling device is configured to lift a bin from the stack, the container being lifted containing inventory items needed to fulfil a customer order. The container is then carried to a pick station where the required inventory item may be manually removed from the bin and placed in a delivery container, the delivery container forming part of the customer order, and being manually filled for dispatch at the appropriate time.

It is beneficial to reduce the weight of each load-handling device. These benefits extend, not only to the device itself in terms of reduced capital and operating expenses, but also to the infrastructure around the device, such as the storage structure and track system. However, in order to ensure that light weight load-handling devices will serve their design purposes and remain functional for a desired service life, it is important to minimise any harmful vibrations that may, over time, compromise its structural integrity.

It is against this background that the invention was devised.

SUMMARY

Accordingly, there is provided, in a first aspect, a load-handling device for lifting and moving storage containers stacked in a storage structure comprising a first set of parallel rails or tracks and a second set of parallel rails or tracks extending substantially perpendicularly to the first set of rails or tracks in a substantially horizontal plane to form a grid pattern comprising a plurality of grid spaces, wherein the grid is supported by a set of uprights to form a plurality of vertical storage locations beneath the grid for containers to be stacked between and be guided by the uprights in a vertical direction through the plurality of grid spaces, the load-handling device comprising a body mounted on a first set of wheels configured to engage with the first set of parallel tracks and a second set of wheels configured to engage with the second set of parallel tracks; a direction-change assembly configured to raise or lower the first and second sets of wheels with respect to the body to engage one of the first or second set of wheels with the parallel tracks and disengage the other of the first or second set of wheels from the parallel tracks; and, a glide bearing assembly comprising a bearing element comprising a sliding surface defining a contact line along which the direction-change assembly moves with respect to the body when raising or lowering the first and second sets of wheels. Using a sliding surface to provide an area of contact between the direction-change assembly and the body reduces noise and vibration when the direction-change assembly moves with respect to the body when compared to conventional bearing assemblies which use a rolling bearing element. The glide bearing assembly further comprises a removable cartridge configured to hold the bearing element in position between the body and the direction-change assembly, wherein the body or the direction-change assembly comprises a bearing mount configured to receive the cartridge. This arrangement provides two advantages. Firstly, from a maintenance perspective, it provides for a straightforward removal and replacement of the bearing elements without the need to disassemble other parts of the bot. Secondly, the provision of removable cartridges enables one to compensate for changes in the dimensions of a contact surface for the glide bearing assembly (e.g., the diameter of a guide shaft or the like). In order to provide smooth, reliable movements during a direction-change manoeuvre; movements that are repeatable over time, and largely free of noise and vibrations, a precise fit between the contact surface and glide bearing assembly is essential. That is to say, the distance between the contact surface and glide bearing assembly must be precise as any variations from the nominal dimensions of the contact surface could have damaging consequences. In order to allow for these variations, differently sized cartridges can be installed that compensate for any changes to the nominal dimensions of the contact surface. So differently sized removable cartridges can be selected according to the dimensions of the contact surface, preventing inaccuracies therebetween, and lessening any noise and vibrations resulting from a direction-change manoeuvre. Compensating for departures from the nominal dimensions of the contact surface cannot be made so easily with conventional bearing arrangements.

Optionally, the body or the direction-change assembly comprises a bore through which the cartridge can be accessed within the bearing mount. This arrangement allows one to use an elongated tool, such as a screwdriver or the like, to prise the removable cartridge out of the bearing mount.

Optionally, the bore is divergent in the direction of the cartridge. This divergent arrangement allows one to use the narrower opening of the bore as a fulcrum about which the elongated tool can pivot in order to lever out the removable cartridge from the bearing mount.

Optionally, the cartridge is configured to be removed from the body or the direction-change assembly in the direction of the low friction contact line. This means that the cartridges can be slid into and out of the bearing mounts along the major axes of the sliding surfaces of the bearing elements as opposed to pushing or pulling them across the minor axes of the sliding surfaces, which could apply a torque to the bearing elements, twisting their positions within the cartridges.

Optionally, the glide bearing assembly further comprises a retaining plate securable to the body or the direction-change assembly so as to hold the cartridge in position with respect to the body or the direction-change assembly. The use of a retaining plate provides a straightforward means for holding the glide bearing assembly together and securing it in position on the body or the direction-change assembly.

Optionally, the glide bearing assembly further comprises a fastener extending through the retaining plate and the cartridge.

Optionally, the cartridge comprises a manual adjustment mechanism configured to adjust the position of the bearing element relative to the cartridge. Alternatively, the cartridge is marked according to its size for ease of identification.

Optionally, the bearing element has a cylindrical shape. As an alternative option, the bearing element has a triangular prism shape. With the latter option, the low friction contact line is preferably located at an apex of the bearing element.

Optionally, the bearing element is made of polytetrafluoroethylene (PTFE).

In a second aspect, there is provided a glide bearing assembly for use with the load-handling device according to the first aspect.

BRIEF DESCRIPTION OF THE DRAWINGS

These and other aspects of the invention will now be described, by way of example only, and with reference to the accompanying drawings, in which.

In the figures, like features are denoted by like reference signs where appropriate.

DETAILED DESCRIPTION

The following embodiments represent preferred examples of how the invention may be practiced, but they are not necessarily the only examples of how this could be achieved. These examples are described in sufficient detail to enable those skilled in the art to practice the invention. Other examples may be utilised and structural changes may be made without departing from the scope of the invention as defined in the appended claims. Moreover, direction references and any other terms having an implied orientation are given by way of example to aid the reader's understanding of the particular examples described herein. They should not be read to be requirements or limitations, particularly as to the position, orientation, or use of the invention unless specifically set forth in the appended claims. Similarly, connection references (e.g., attached, coupled, connected, joined, secured, and the like) are to be construed broadly and may include intermediate members between a connection of elements and relative movement between elements. As such, connection references do not necessarily infer that two elements are directly connected and in fixed relation to each other, unless specifically set forth in the appended claims. Similarly, wording such as "movement in the n-direction" and any comparable wording, where n is one of x, y and z, is intended to mean movement substantially along or parallel to the n-axis, in either direction (i.e., towards the positive end of the n-axis or towards the negative end of the n-axis).

Figure 1:
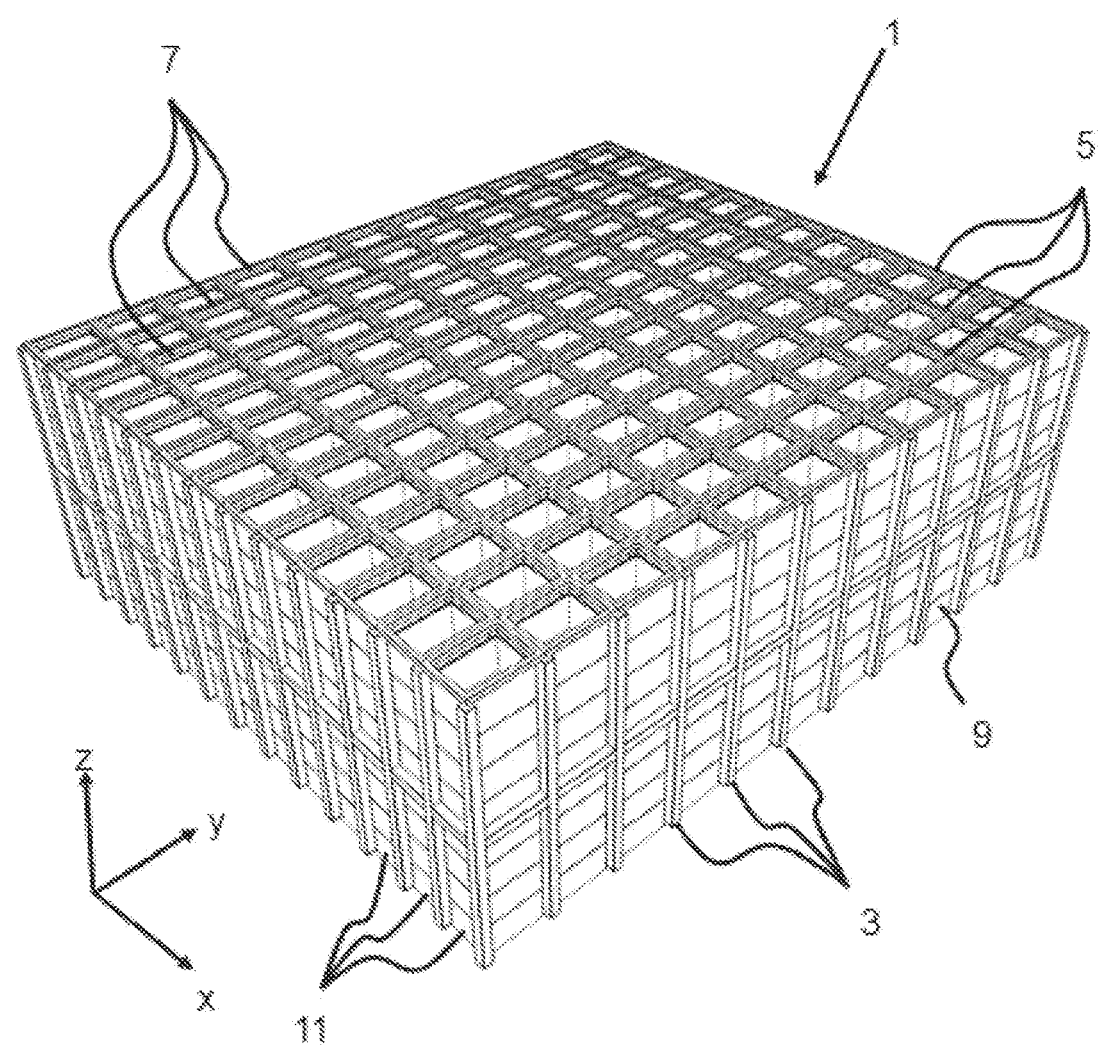
FIG. 1 schematically illustrates a storage structure and containers.

FIG. 1 illustrates a storage structure 1 comprising upright members 3 and horizontal members 5, 7 which are supported by the upright members 3. The horizontal members 7 extend parallel to one another in the illustrated x-axis, whereas the horizontal members 5 extend parallel to one another in the illustrated y-axis, and transversely to the horizontal members 7. The upright members 3 extend parallel to one another in the illustrated z-axis. The horizontal members 5, 7 form a grid pattern defining a plurality of grid cells. In the illustrated example, containers 9 are arranged in stacks 11 beneath the grid cells defined by the grid pattern, with one stack 11 of containers 9 per grid cell.

Figure 2:
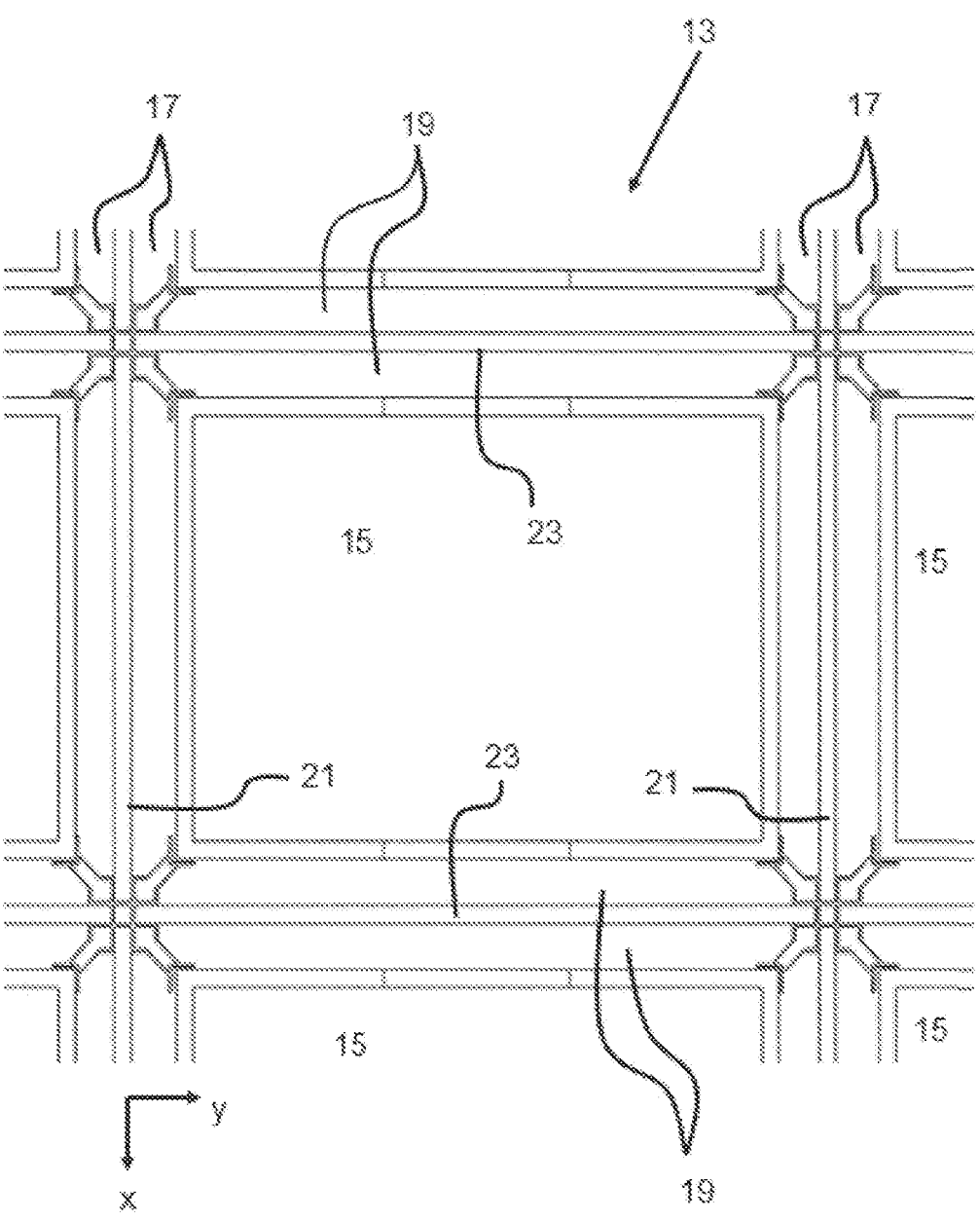
FIG. 2 schematically illustrates track on top of the storage structure illustrated in FIG. 1.

FIG. 2 shows a large-scale plan view of a section of a track structure 13, generally designated by 13, located on top of the horizontal members 5, 7 and forming part of the storage structure 1 illustrated in FIG. 1. The track structure 13 may be provided by the horizontal members 5, 7 themselves (e.g., formed in or on the surfaces of the horizontal members 5, 7) or by one or more additional components mounted on top of the horizontal members 5, 7. The illustrated track structure 13 comprises x-direction tracks 17 and y-direction tracks 19. In this case, a first set of tracks 17 extend in the x-direction and a second set of tracks 19 extend in the y-direction, transverse to the first set of tracks 17. The tracks 17, 19 define apertures 15 at the centres of the grid cells. The apertures 15 are sized to allow containers 9 located beneath the grid cells to be lifted and lowered through the apertures 15. The first set of tracks 17 are provided in pairs separated by ridges 21, and the second set of tracks 19 are provided in pairs separated by ridges 23. Other arrangements of track structure may also be possible.

Figure 3:
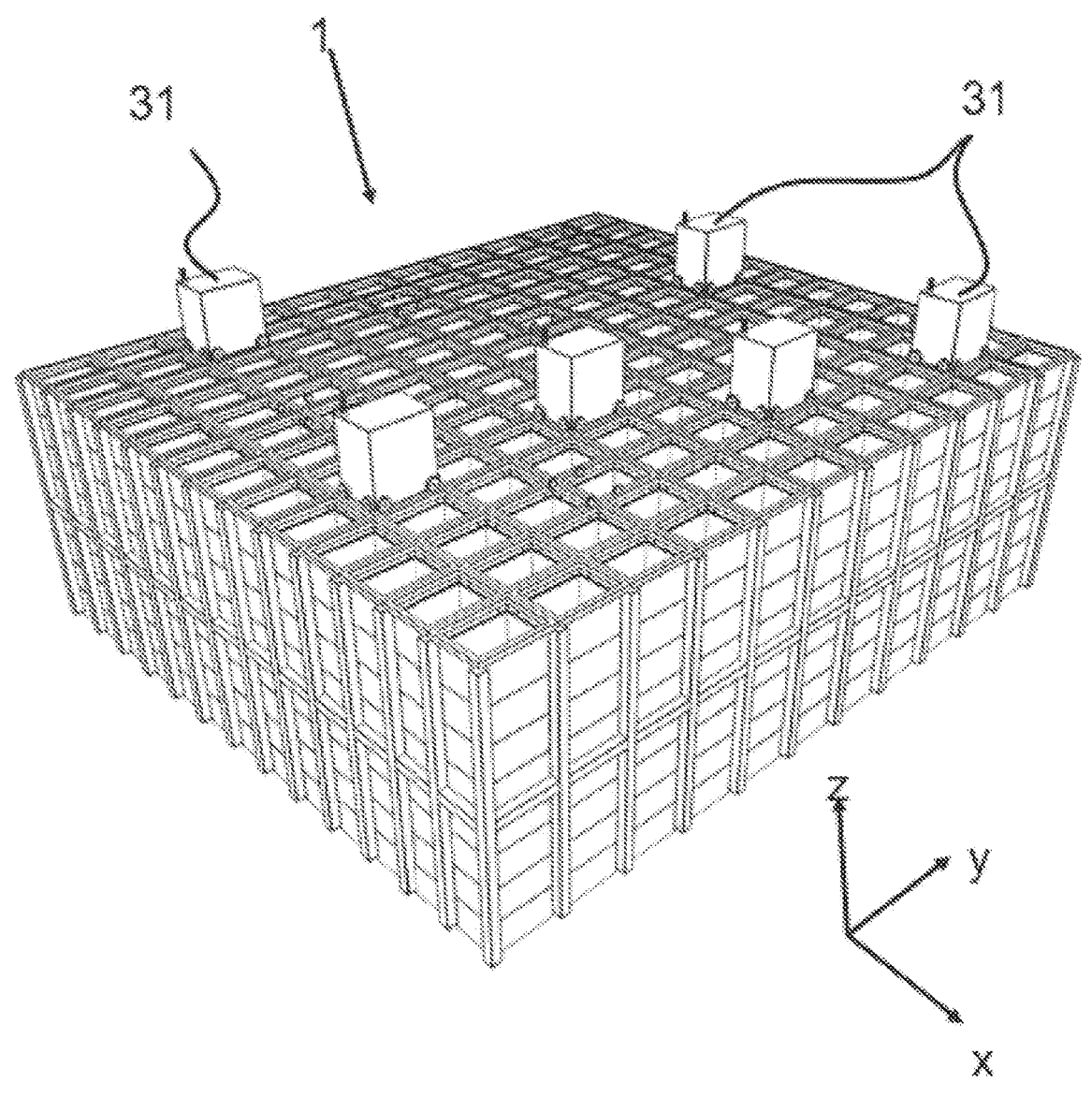
FIG. 3 schematically illustrates load-handling devices on top of the storage structure illustrated in FIG. 1.

FIG. 3 shows a plurality of load-handling devices 31 moving on top of the storage structure 1 illustrated in FIG. 1. Each load-handling device 31, which may also be referred to as a robot 31 or bot 31, is provided with a direction-change assembly (not shown) and sets of wheels to engage with corresponding x- or y-direction tracks 17, 19 to enable the bot 31 to travel across the track structure 13 and reach specific grid cells. As mentioned, the sets of tracks 17, 19 are separated by ridges 21, 23 allowing a pair of bots 31 to occupy neighbouring grid cells or pass one another without colliding.

Figure 4:
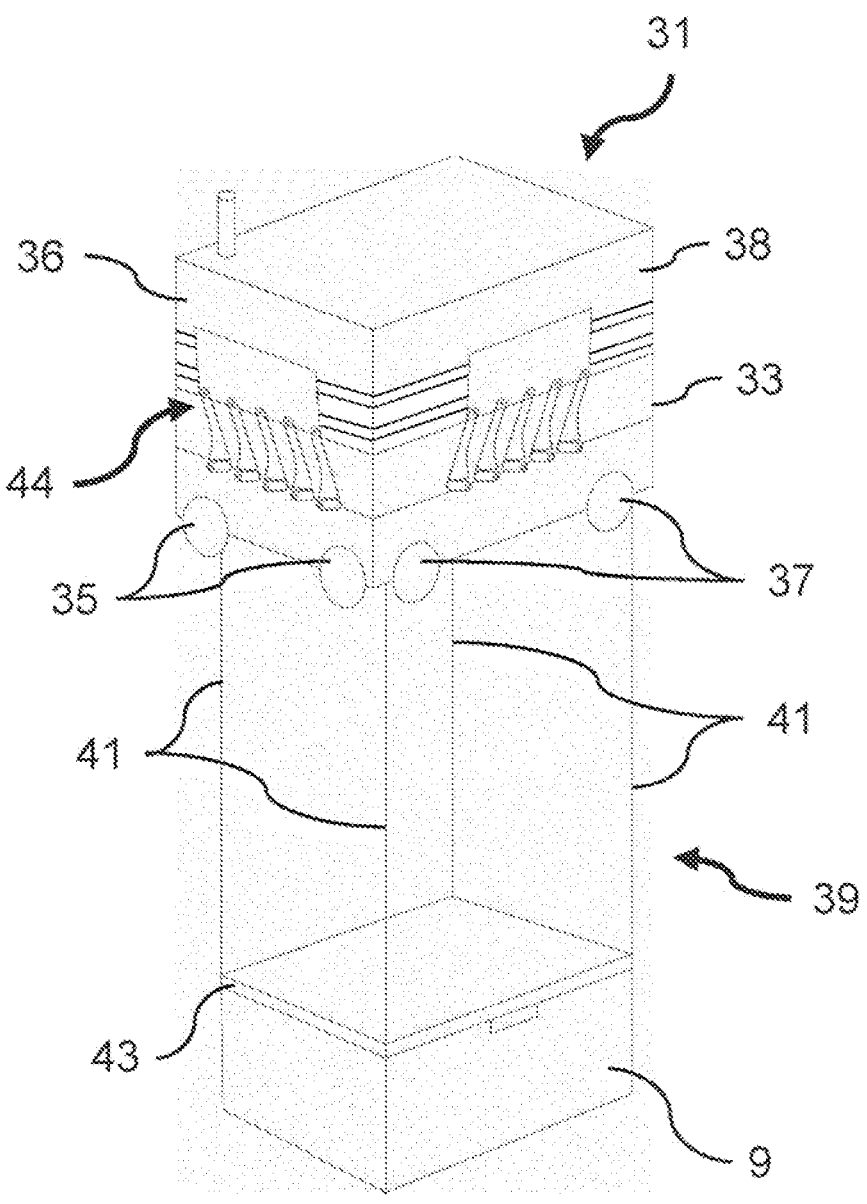
FIG. 4 schematically illustrates a single load-handling device showing a direction-change assembly and a container-lifting means in a lowered position.

As illustrated in detail in FIG. 4, a bot 31 comprises a body 33 in or on which are mounted one or more components which enable the bot 31 to perform its intended functions. These functions may include moving across the storage structure 1 on the track structure 13, and lowering or raising containers 9 to or from the stacks 11 so that the bot 31 can deposit or retrieve containers 9 in specific locations defined by the grid pattern. In order to perform the latter function, the bot 31 comprises container-lifting means 39 configured to raise a container 9 from a stack 11 into a container-receiving space or cavity of the bot 31 and lower a container 9 from the container-receiving space onto a stack 11. The illustrated container-lifting means 39 comprises four tapes or reels 41 which are connected at their lower ends to a container-engaging assembly 43. The container-engaging assembly 43 comprises engaging means (which may, for example, be provided at the corners of the container-engaging assembly 43, in the vicinity of the tapes 41) configured to engage with features of the containers 9. For instance, the containers 9 may be provided with one or more apertures in their upper sides with which the engaging means can engage. Alternatively or additionally, the engaging means may be configured to hook under the rims or lips of the containers 9, and/or to clamp or grasp the containers 9. The tapes 41 may be wound up or down to raise or lower the container-engaging assembly 43, as required. One or more motors or other means may be provided to effect or control the winding up or down of the tapes 41. In alternative embodiments, the container-receiving space of the bot 31 may not be within the body 33 of the bot 31. For example, in some embodiments, the container-receiving space may be adjacent to the body 33 of the bot 31 (e.g., in a cantilever arrangement with the weight of the body 33 of the bot 31 counterbalancing the weight of the container to be lifted). In such embodiments, a frame or arms of the container-lifting means 39 may protrude horizontally from the body 33 of the bot 31, and the tapes/reels 41 may be arranged at respective locations on the protruding frame and configured to be raised and lowered from those locations to raise and lower a container 9 into the container-receiving space adjacent to the body 33. The height at which the frame is mounted on and protrudes from the body 33 of the bot 31 may be chosen to provide a desired effect. For example, it may be preferable for the frame to protrude at a high level on the body 33 of the bot 31 to allow a comparatively larger container or a plurality of containers to be raised into the container-receiving space beneath the frame. Alternatively, the frame may be arranged to protrude lower down the body 33 (but still high enough to accommodate at least one container between the frame and the track structure 13) to keep the centre of mass of the bot 31 lower when the bot 31 is loaded with a container.

The bot 31 further comprises first and second sets of wheels 35, 37, which are mounted on the body 33 and enable the bot 31 to move in the x- and y-directions along the tracks 17 and 19, respectively. In particular, two wheels 35 are provided on the shorter side 36 of the bot 31 visible in FIG. 4, and a further two wheels 35 are provided on the opposite shorter side 36 of the bot 31. The wheels 35 engage with tracks 17 and are rotatably mounted on the body 33 of the bot 31 to allow it to move along the tracks 17. Analogously, two wheels 37 are provided on the longer side 38 of the bot 31 visible in FIG. 4, and a further two wheels 37 are provided on the opposite longer side 38 of the bot 31. The wheels 37 engage with tracks 19 and are rotatably mounted on the body 33 of the bot 31 to allow the bot 31 to move along the tracks 19.

The direction-change assembly, generally designated by 44, enables the bot 31 to move on the different wheels 35, 37 in the first and second directions, selectively engaging either the first set of wheels 35 with the first set of tracks 17 or the second set of wheels 37 with the second set of tracks 19. The direction-change assembly 44 may be driven by a single motor (not shown) and is configured to raise and lower the first set of wheels 35 and/or the second set of wheels 37 relative to the body 33, thereby enabling the load-handling device 31 to selectively move in either the first direction or the second direction across the tracks 17, 19 of the storage structure 1.

Figure 5:
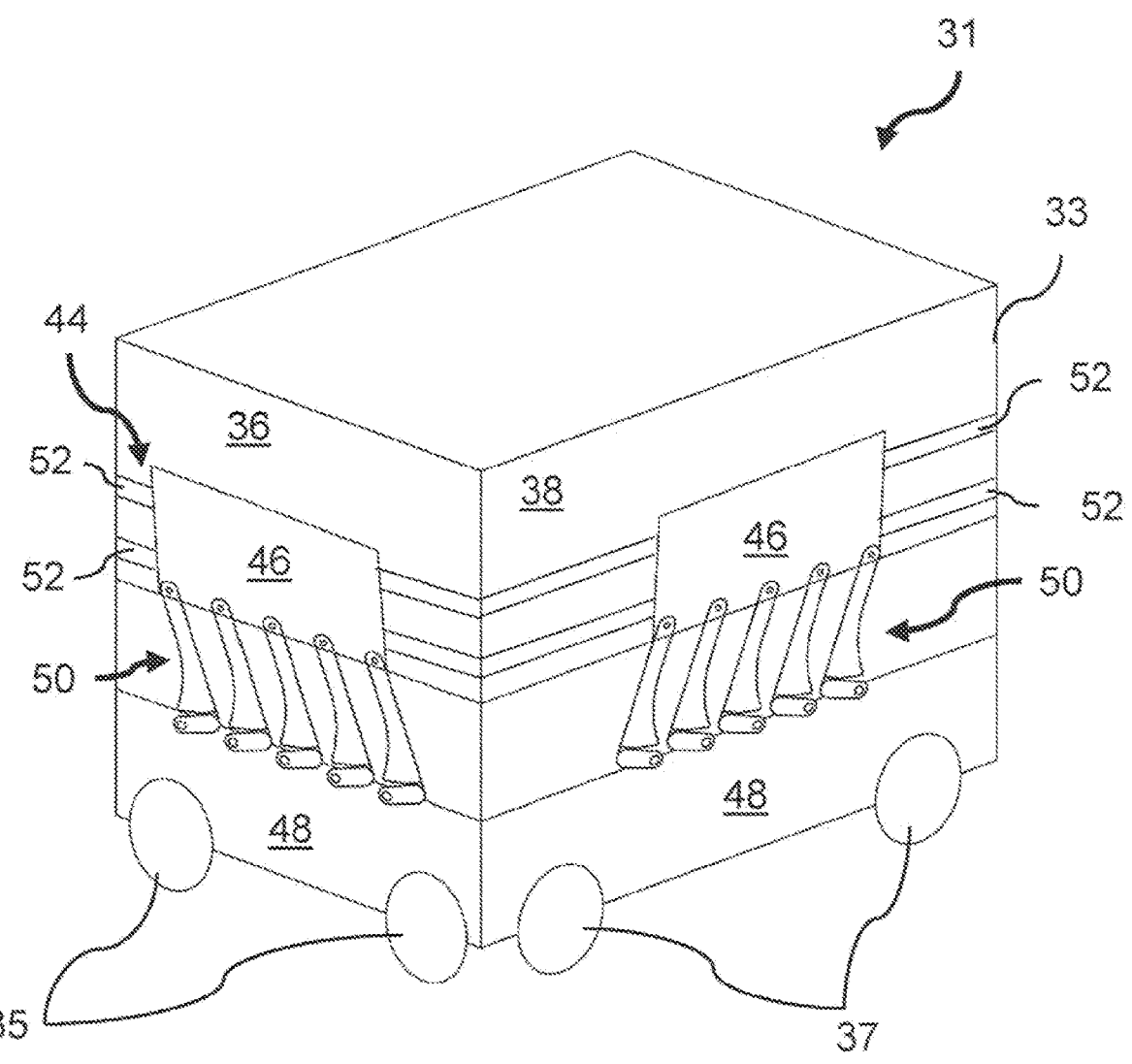
FIG. 5 schematically illustrates the single load-handling device of FIG. 4 with the container-lifting means in a raised position.
Figures 6A, 6B:
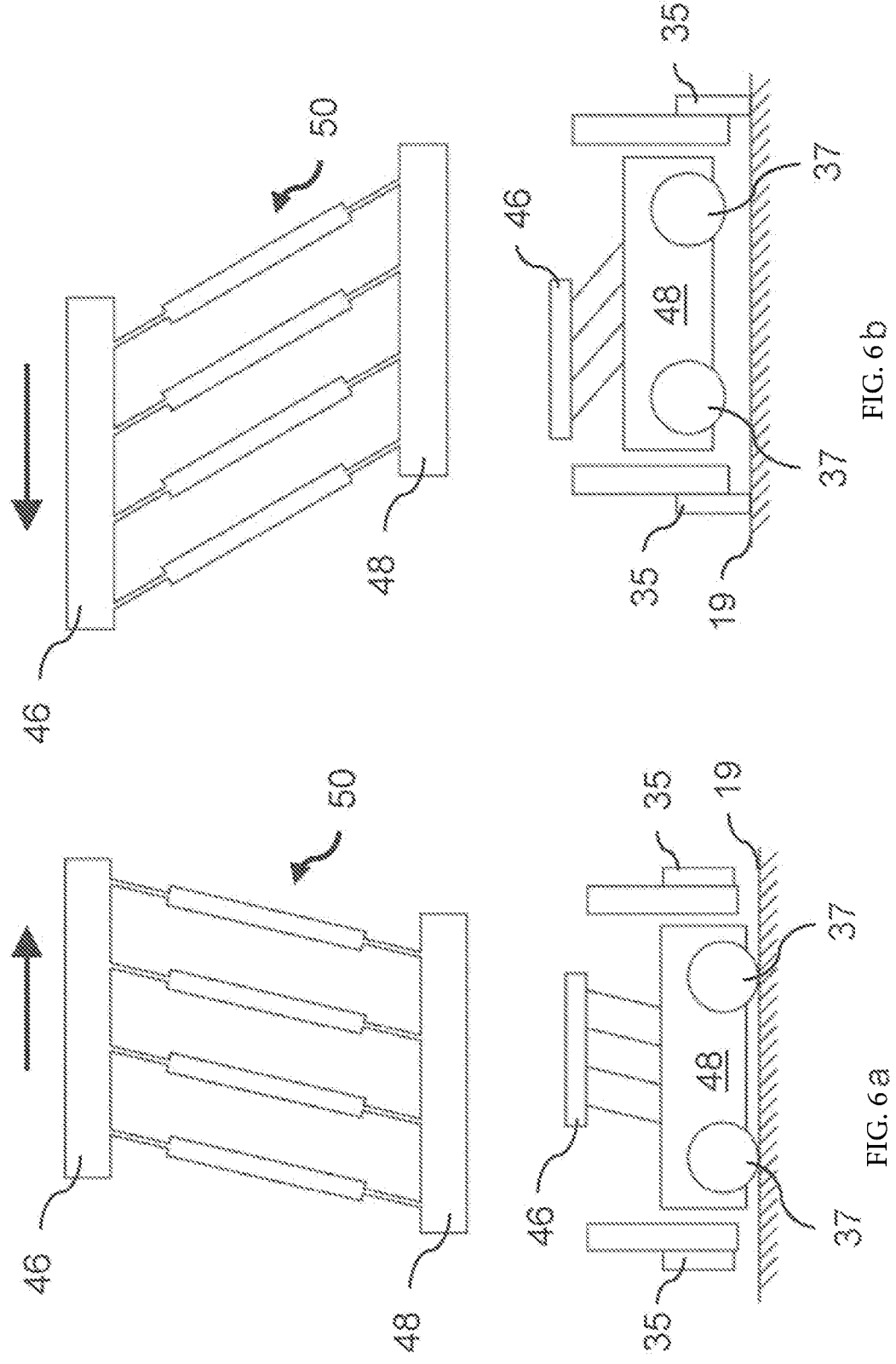
FIGS. 6a and 6b schematically illustrate the operation of the direction-change assembly of the load-handling device of FIG. 4.

As can be seen in FIG. 5, the direction-change assembly 44 comprises four wheel mounts 48 upon which are mounted the first and second sets of wheels 35, 37. One wheel mount 48 is provided on each of the opposed shorter sides 36 of the bot 31 and the two remaining wheel mounts 48 are each provided on the longer sides 38. Each wheel mount 48 is configured to move substantially vertically to raise or lower the first and second sets of wheels 35, 37 with respect to the body 33 of the bot 31 so as to engage one of the first or second set of wheels 35, 37 with the parallel tracks 17, 19 and disengage the other of the first or second set of wheels 35, 37 from the parallel tracks 17, 19. In order to carry out this manoeuvre, the direction-change assembly 44 further comprises four horizontal travelers 46 connected to a respective wheel mount 48 via a set of linkages 50. The horizontal travelers 46 are configured to shift sideways along horizontal guide rails 52 under an applied force to pull upwards or push downwards their respective wheel mount 48 through the sets of linkages 50. This action is illustrated schematically in FIGS. 6*a* and 6*b*, which show some parts of the direction-change assembly 44 associated with one of the longer sides 38 of the bot 31. It will, however, be appreciated that those equivalent parts of the direction-change assembly 44 associated with a different side 36, 38 of the bot 31 work in a similar manner. Turning to FIG. 6*a*, when a first sideways force is applied to the horizontal traveler 46, which in this example is applied in a right direction, the horizontal traveler 46 is displaced rightward. This rightward displacement, which angles the set of linkages 50 slightly away from vertical, translates into a vertical movement directing the wheel mount 48 downwards with respect to the horizontal traveler 46, causing the two wheels of the second set of wheels 37 associated with this side 38 of the bot 31 to engage with the second set of tracks 19 to support the body 33 above the parallel tracks 17, 19. When a second sideways force is applied to the horizontal traveler 46, which in the example shown in FIG. 6*b* is directed leftward, the horizontal traveler 46 is displaced leftward along the horizontal guide rails 52. The extent of the leftward displacement is comparatively greater than the rightward displacement experienced by the horizontal traveler 46 under the first sideways force. This causes the set of linkages 50 to be angled further away from the vertical when compared to the example shown in FIG. 6*a*, comparatively decreasing the vertical distance between the horizontal traveler 46, which, of course, remains in a fixed vertical position with respect to the body 33, and the wheel mount 48. That is to say, in this example, the leftward displacement of the horizontal traveler 46 translates into vertical movement directing the wheel mount 48 upwards with respect to the horizontal traveler 46, causing the two wheels of the second set of wheels 37 to disengage with the second set of tracks 19. It is through this arrangement, by translating a sideways movement of the horizontal travelers 46 into a vertical movement of their respective wheel mounts 48, that the direction-change assembly 44 is configured to lower and raise the first and second sets of wheels 35, 37 so as to engage and disengage the parallel tracks 17, 19.

Figure 7:
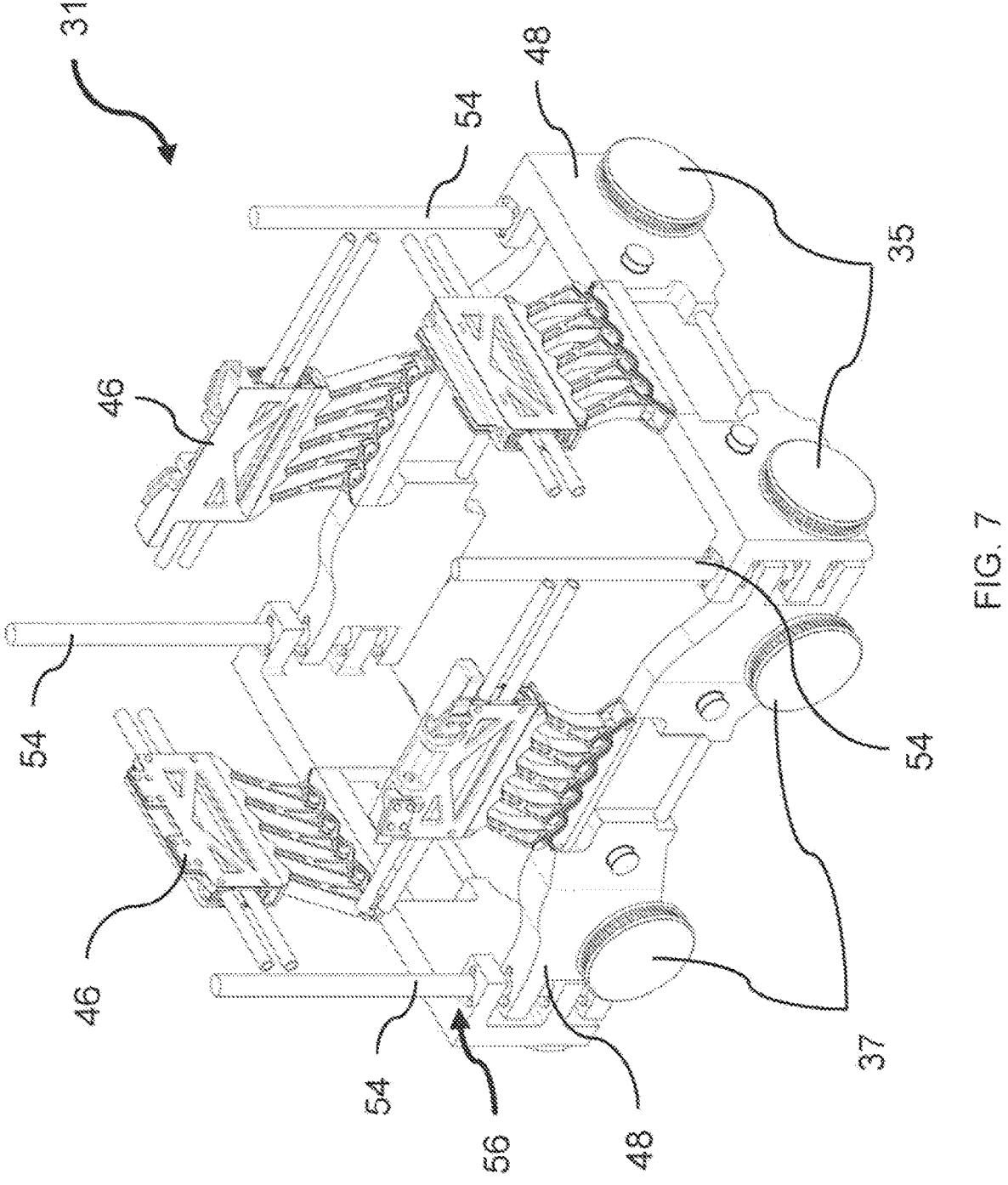
FIG. 7 is an isometric view of part of a load-handling device showing elements of the direction-change assembly and the body of the device.
Figure 8:
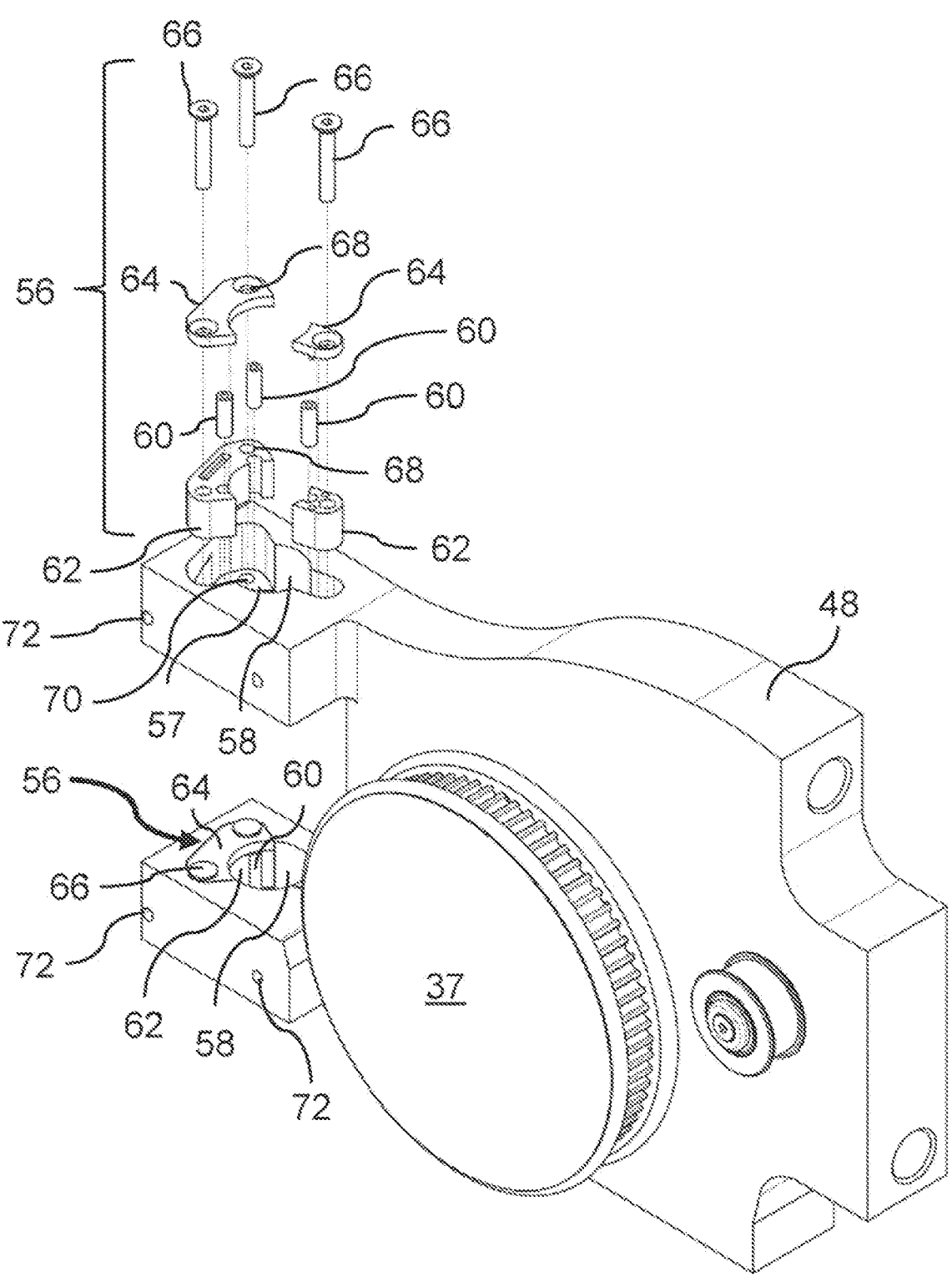
FIG. 8 is a perspective view of part of a wheel mount of the direction-change assembly of FIG. 7 with an exploded view of a glide bearing assembly.

With reference to FIG. 7, the body 33 comprises four substantially vertical guide shafts 54, each shaft 54 being positioned at a respective corner of the bot 31. The ends of the wheel mounts 48 are slidably mounted on the guide shafts 54, which serve to guide the vertical movements of the wheel mounts 48 during a direction-change manoeuvre. This sliding engagement between the wheel mounts 48 and the guide shafts 54 is provided by a plurality of glide bearing assemblies 56 that are, in this example, fixed to the wheel mounts 48. Specifically, in this embodiment, each wheel mount 48 comprises four glide bearing assemblies 56, two on each end. The glide bearing assemblies 56 are configured to define a channel 58 through which a guide shaft 54 is received. Each assembly 56 comprises at least one bearing element 60 having a sliding surface, defining a low friction contact line between the wheel mount 48 and the guide shaft 54, and along which the wheel mounts 48 move with respect to guide shafts 54 when raising or lowering the first and second sets of wheels 35, 37. The bearing element 60 may be made of polytetrafluoroethylene (PTFE) or any other material having a similarly low coefficient of friction. Turning to FIG. 8, in this example, each of the glide bearing assemblies 56 that are fixed to the wheel mounts 48 comprises three bearing elements 60. The bearing elements 60 are positioned at equal intervals about guide shaft 54 so as to distribute more evenly any loads experienced by the glide bearing assembly 56 during a direction-change manoeuvre. The bearing elements 60 are orientated such that their longitudinal axes extend in the direction of the movement between the wheel mounts 48 and guide shafts 54, and, in this example, have a cylindrical shape in order to lessen the extent of the tangential contact region of the sliding surface while maximising the contact region in the direction of their longitudinal axes so as to provide stability to the wheel mounts 48 during a direction-change manoeuvre. It will of course be appreciated that alternatively shaped bearing elements 60 could be used in the glide bearing assemblies 56. One such example is a bearing element 60 having a triangular prism shape and being orientated such that the low friction contact line, providing a connection between the guide shaft 54 and the wheel mounts 48, is located along one of its apices.

The bearing elements 60 are held within one or more removable cartridges 62 which also form part of the glide bearing assembly 56. In the example shown in FIG. 8, the glide bearing assembly 56 comprises two removable cartridges 62 for holding the bearing elements 60 in position between the guide shaft 54 and the wheel mounts 48. In this example, the cartridges 62 are arranged such that one holds a single bearing element 60 while the other holds two bearing elements 60. The removable cartridges 62 are received within respective bearing mounts 57 that, in this example, form part of the wheel mounts 48. The use of removable cartridges 62 has two primary advantages. Firstly, from a maintenance perspective, it provides for a straightforward removal and replacement of the bearing elements 60 without the need to disassemble other parts of the bot 31. This is particularly true in the present example in which the removable cartridges 62 and bearing mounts 57 are configured such that the cartridges 62 can be lifted upward from and pushed downward into the bearing mounts 57 in substantially the same direction as the longitudinal axes of the bearing elements 60. This means that the cartridges 62 can be slid into and out of the bearing mounts 57 along the major axes of the sliding surfaces of the bearing elements 60 as opposed to pushing or pulling them across the minor axes of the sliding surfaces, which could apply a torque to the bearing elements 60, twisting their positions within the cartridges 62. Secondly, the provision of removable cartridges 62 enables one to compensate for changes in the diameter of the guide shaft 54. As mentioned above, the glide bearing assemblies 56 define channels 58 through which a guide shaft 54 is received, and it is the removable cartridges 62, together with the bearing elements 60, that mostly define these channels 58. In order to provide smooth, reliable movements during a direction-change manoeuvre; movements that are repeatable over time, and largely free of noise and vibrations, a precise fit between the guide shaft 54 and glide bearing assemblies 56 is essential. That is to say, the distance between the guide shaft 54 and glide bearing assemblies 56 must be precise as any variations from the nominal diameter of the guide shafts 54, from one guide shaft 54 to another, could have damaging consequences. And such variations do not necessarily have to be outside of the expected tolerance of the guide shafts 54 (e.g., ±0.5 mm) to give rise to negative effects. In order to allow for these variations, differently sized cartridges 62 can be installed in the wheel mounts 48 that, while fitting accurately within the bearing mounts 57, define a larger or smaller channel 58 through which a guide shaft 54 is received depending on the size of the shaft 54. So differently sized removable cartridges 62 can be selected according to the size of the guide shaft 54 with which they are to be used, preventing inaccuracies therebetween, and lessening any noise and vibrations resulting from a direction-change manoeuvre. And the differently sized cartridges can be marked according to their respective sizes for ease of identification. Compensating for departures from the nominal diameter the guide shafts 54 cannot be made so easily with conventional bearing arrangements. As an alternative to using cartridges 62 having different sizes, each cartridge 62 may instead comprise a manual adjustment mechanism configured to adjust the position of the one or more bearing elements 60 that it holds relative to itself, bringing the bearing elements 60 of the glide bearing assembly 56 closer to or further from each other.

The glide bearing assembly 56 further comprises a retaining plate 64 securable to the wheel mount 48 so as to hold the removable cartridges 62 in position within the bearing mounts 57 during use. In the present example, each glide bearing assembly 56 comprises two retaining plates 64, one for each of the removable cartridges 62. Each retaining plate 64 is positioned on top of its respective removable cartridge 62 and held in position by one or more fasteners 66, which in this example, comprise threaded screws. The retaining plates 64 and removable cartridges 62 each comprise one or more open bores 68, and the bearing mounts 57 comprise one or more threaded closed bores 70. The bores 68, 70 are respectively positioned so as to align when the removable cartridges 62 and retaining plates 64 are assembled within the bearing mounts 57. This arrangement allows a fastener 66 to extend through the removable cartridges 62 and retaining plates 64, and be secured within the threaded bore 70 to hold the assembly 56 together. In order to remove a removable cartridge 62 from the bearing mount 57, the relevant fastener 66 is unscrewed and the associated retaining plate 64 is lifted from the removable cartridge 62. The removable cartridge 62 itself can then be removed from the bearing mount 57. To facilitate the extraction of the removable cartridges 62 from the bearing mount 57, the bearing mount 57 comprises one or more access bores 72 through which one can access the removable cartridge 62 using an elongated tool, such as a screwdriver or the like, to prise it out of the bearing mount 57. The access bores 72 extend from the outer surface of the wheel mount 48 through to the side of the bearing mount 57, and are divergent in the direction of the removable cartridge 62. That is to say, the cross-sectional area of the access bores 72 increases in the direction of the bearing mount 57. This divergent arrangement allows one to use the narrower openings of the access bores 72, on the outer surface of the wheel mount 48, as a fulcrum about which the elongated tool can pivot in order to lever out the removable cartridge 62 from the bearing mount 57.

Figure 9:
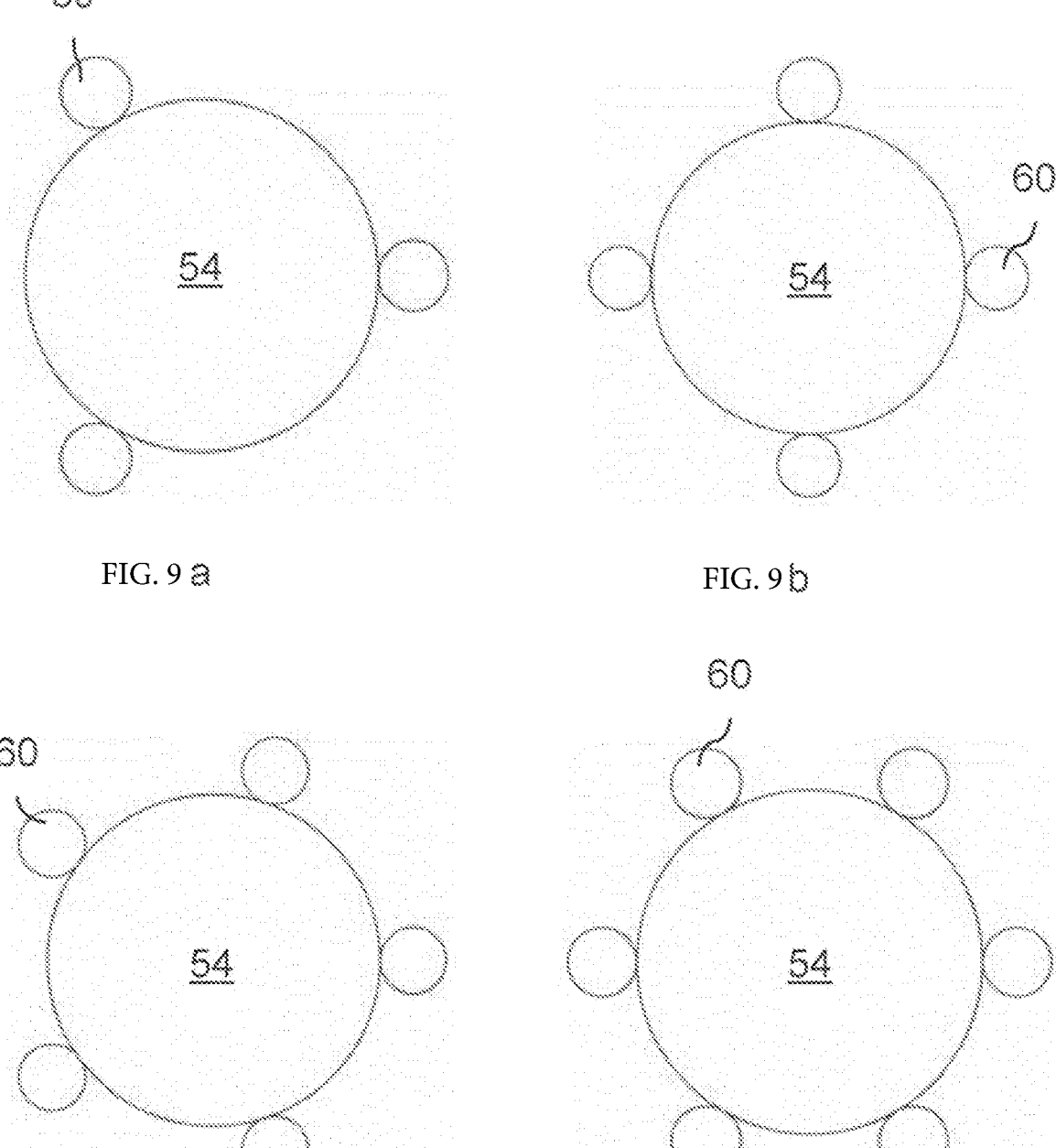
FIGS. 9a to 9d show examples of how bearing elements of the glide bearing assembly of FIG. 8 might be configured.

The glide bearing assembly 56 of the present example comprises three bearing elements 60 positioned at equal intervals about the guide shaft 54. This arrangement is shown schematically in FIG. 9a, but other configurations are of course envisaged. In this example, the bearing elements 60 are held within two removable cartridges 62, one cartridge 62 holding a single bearing element 60 and the other holding two bearing elements 60. However, the choice as to how many removable cartridges 62 and bearing elements 60 are used is dominated to a large extent by the available space around the guide shaft 54 and is not limited to the specific example shown herein. For example, with reference to FIG. 9b, the glide bearing assembly 56 may comprise four bearing elements 60, each held within a respective cartridge 62. Alternatively, the four bearing elements 60 may be held in two removable cartridges 62, each carrying two bearing elements 60, or one cartridge 62 carrying a single bearing element 60 while the other carries the remaining three bearing elements 60. In further examples shown in FIGS. 9c and 9d, the glide bearing assembly 56 may comprise five or six bearing elements 60 positioned at equal intervals about the guide shaft 54, with the bearing elements 60 held within two or more removable cartridges 62. So the benefits of the glide bearing assembly 56 described above can be realised regardless of the number and arrangement of the bearing elements 60 and removable cartridges 62.

Figure 10:
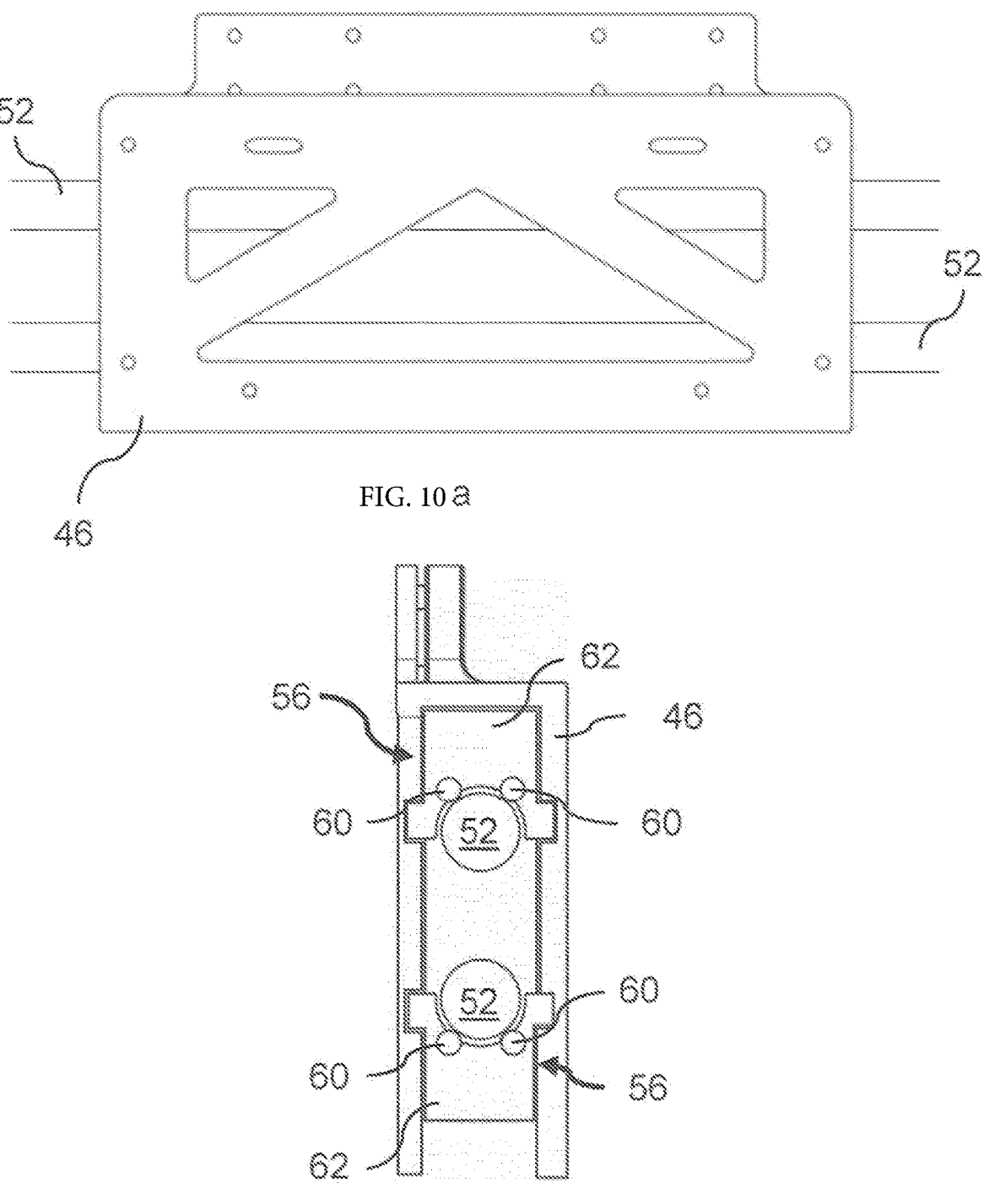
FIGS. 10a and 10b show a front and a side end view of a horizontal traveler of the direction-change assembly of FIG. 7; and, FIG. 11 is a perspective view of the horizontal traveler of FIGS. 10a and 10b with an exploded view of glide bearing assemblies.

To this point, the glide bearing assembly 56 has been discussed in the context of providing a sliding engagement between the wheel mounts 48 and the guide shafts 54. However, variations of the glide bearing assembly 56 may be used to provide a sliding engagement between other parts of the direction-change assembly 44 and the body 33 of the bot 31. Specifically, the glide bearing assembly 56 could be used between the horizontal traveler 46, which forms part of the direction-change assembly 44, and horizontal guide rails 52, which is part of the body 33 of the bot 31. With reference to FIGS. 10a and 10b, and as mentioned above, the horizontal travelers 46 are driven left or right along their respective horizontal guide rails 52 in order to raise or lower the first or second sets of wheels 35, 37. Each horizontal traveler 46 comprises four glide bearing assemblies 56, with two assemblies 56 being positioned at either side of the horizontal traveler 46 (shown in FIG. 10b without their respective retaining plates 64). In this arrangement, two of the four glide bearing assemblies 56 slidingly engage and support the horizontal traveler 46 on the upper horizontal guide rail 52, and the remaining two glide bearing assemblies 56 slidingly engage and support the horizontal traveler 46 on the lower horizontal guide rail 52. Each glide bearing assembly 56 comprises two bearing elements 60 having respective sliding surfaces, each of which define a low friction contact line along which the horizontal traveler 46 moves with respect to the horizontal guide rail 52 when raising or lowering the first or second sets of wheels 35, 37.

Figure 11:
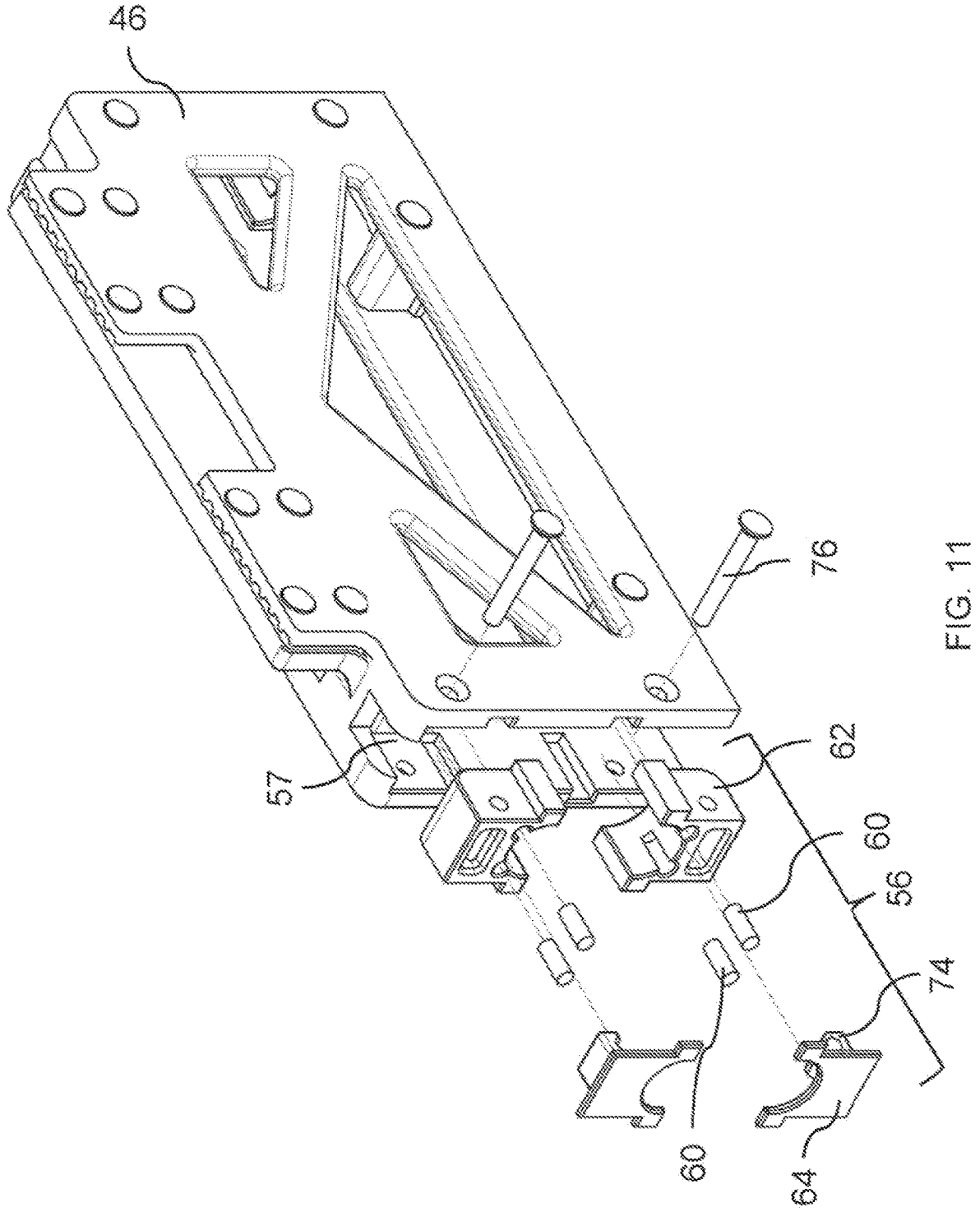

With reference to FIG. 11, the bearing assemblies 56 used for the horizontal traveler 46 are substantially similar to those used for the wheel mounts 48 insofar that they each comprise a removable cartridge 62 received within a bearing mount 57 of the horizontal traveler 46. The removable cartridge 62 is configured to hold two elongated bearing elements 60 extending in the direction in which the horizontal traveler 46 is displaced to provide a low friction contact line extending in that same direction. The bearing elements 60 are held in position within the removable cartridge 62 by a retaining plate 64 placed over the removable cartridge 62. The retaining plate 64 comprises a hooked arm 74 that extends rewardly through the removable cartridge 62 when the bearing assembly 56 is assembled. The hooked arm 74 is configured to engage a securing bolt 76, which is arranged to pass through the horizontal traveler 46 and the removable cartridge 62, to hold the assembly 56 in place during use. This variation of the glide bearing assembly 56 has all of the attendant advantages provided by the variation used in the wheel mount 48. That is to say, they provide a low friction contact line along which the direction-change assembly 44 moves with respect to the body 31, lessening any noise and vibrations resulting from a direction-change manoeuvre when compared to known bearing arrangements. Moreover, the provision of removable cartridges 62 provides for a straightforward removal and replacement of the bearing elements 60 without the need to disassemble other parts of the bot 31, and enables one to compensate for changes in the diameter of the guide rails 52.

It will be appreciated by those skilled in the art that the present invention has been described by way of example only, and that a variety of alternative approaches may be adopted without departing from the scope of the invention as defined by the appended claims. For example, the glide bearing assemblies 56 are shown attached to the direction-change assembly 44 (i.e., the wheel mount 48 and horizontal traveler 46, both of which form part of the direction-change assembly 44) to provide a low friction contact line along which the direction-change assembly 44 moves with respect to the body 33 of the bot 31. Other embodiments are envisaged in which this sliding engagement between the direction-change assembly 44 and the body 33 of the bot 31 is provided by a variation of the glide bearing assemblies 56 disclosed herein, but which is attached to the body 33 of the bot 31 as opposed to the direction-change assembly 44.

The invention claimed is:

1. A load-handling device for lifting and moving storage containers stacked in a storage structure having a first set of parallel rails or tracks, and a second set of parallel rails or tracks extending substantially perpendicularly to the first set of rails or tracks, in a substantially horizontal plane to form a grid with a grid pattern including a plurality of grid spaces, wherein the grid is supported by a set of uprights to form a plurality of vertical storage locations beneath the grid for containers to be stacked between, and to be guided by, the uprights in a vertical direction through the plurality of grid spaces, the load-handling device comprising:

a body mounted on a first set of wheels configured to engage with a first set of parallel tracks, and a second set of wheels configured to engage with a second set of parallel tracks;

a direction-change assembly configured to raise or lower the first and second sets of wheels with respect to the body to engage one of the first or second sets of wheels with the parallel tracks and disengage the other of the first or second sets of wheels from the parallel tracks; and a glide bearing assembly including:

a bearing element including a sliding surface defining a contact line along which the direction-change assembly moves with respect to the body when raising or lowering the first and second sets of wheels; and a removable cartridge configured to hold the bearing element in position between the body and the direction-change assembly, wherein the body or the direction-change assembly includes a bearing mount configured to receive the cartridge.

2. A load-handling device according to claim 1, wherein the body or the direction-change assembly comprises:

a bore through which the cartridge can be accessed.

3. A load-handling device according to claim 2, wherein the bore is divergent in a direction of the cartridge.

4. A load-handling device according to claim 1, wherein the cartridge is configured to be removed from the body or the direction-change assembly in a direction of the contact line.

5. A load-handling device according to claim 1, wherein the glide bearing assembly comprises:

a retaining plate securable to the body or the direction-change assembly so as to hold the cartridge in position with respect to the body or the direction-change assembly.

6. A load-handling device according to claim 5, wherein the glide bearing assembly comprises:

a fastener extending through the retaining plate and the cartridge.

7. A load-handling device according to claim 1, wherein the cartridge comprises:

a manual adjustment mechanism configured to adjust a position of the bearing element relative to the cartridge.

8. A load-handling device according to claim 1, wherein the cartridge is marked according to its size for identification.

9. A load-handling device according to claim 1, wherein the bearing element has a cylindrical shape.

10. A load-handling device according to claim 1, wherein the bearing element has a triangular prism shape.

11. A load-handling device according to claim 10, wherein the contact line is located at an apex of the bearing element.

12. A load-handling device according to claim 1, wherein the bearing element is made of polytetrafluoroethylene.

13. A glide bearing assembly configured for a load-handling device having a body mounted on a first set of wheels configured to engage with a first set of parallel tracks, and a second set of wheels configured to engage with a second set of parallel tracks; and a direction-change assembly configured to raise or lower the first and second sets of wheels with respect to the body to engage one of the first or second sets of wheels with the parallel tracks and disengage the other of the first or second sets of wheels from the parallel tracks, the glide bearing assembly comprising:

a bearing element including a sliding surface defining a contact line along which a direction-change assembly will move with respect to a body when raising or lowering first and second sets of wheels of the load-handling device; and a removable cartridge configured to hold the bearing element in position between the body and the direction-change assembly.

\* \* \* \* \*